United States Patent
Wu

(10) Patent No.: US 10,638,670 B2
(45) Date of Patent: May 5, 2020

(54) FULL SPECTRUM LED PLANT ILLUMINATION LAMP WITH A LENS STRUCTURE

(71) Applicant: Yuyao Tanghong International Trade Co., Ltd, Yuyao (CN)

(72) Inventor: BaiJun Wu, Yuyao (CN)

(73) Assignee: YUYAO TANGHONG INTERNATIONAL TRADE CO., LTD, Yuyao (CN)

(*) Notice: Subject to any disclaimer, the term of this patent is extended or adjusted under 35 U.S.C. 154(b) by 0 days.

(21) Appl. No.: 16/411,054

(22) Filed: May 13, 2019

(65) Prior Publication Data
US 2019/0364744 A1    Dec. 5, 2019

(30) Foreign Application Priority Data
May 29, 2018   (CN) ........................ 2018 1 0531577

(51) Int. Cl.
| | |
|---|---|
| F21V 29/76 | (2015.01) |
| A01G 7/04 | (2006.01) |
| F21V 29/89 | (2015.01) |
| F21V 5/00 | (2018.01) |
| F21V 15/01 | (2006.01) |
| F21V 23/00 | (2015.01) |
| F21V 31/00 | (2006.01) |
| F21Y 113/13 | (2016.01) |
| F21Y 115/10 | (2016.01) |
| F21V 17/12 | (2006.01) |

(52) U.S. Cl.
CPC ............. *A01G 7/045* (2013.01); *F21V 5/007* (2013.01); *F21V 15/01* (2013.01); *F21V 23/001* (2013.01); *F21V 29/763* (2015.01); *F21V 29/89* (2015.01); *F21V 31/005* (2013.01); *F21V 17/12* (2013.01); *F21Y 2113/13* (2016.08); *F21Y 2115/10* (2016.08)

(58) Field of Classification Search
CPC .......... F21V 15/01; F21V 29/89; F21V 5/007; F21V 23/001; F21V 31/005; A01G 7/045
See application file for complete search history.

(56) References Cited

U.S. PATENT DOCUMENTS

2019/0059237 A1* 2/2019 Johnson ................. A01G 7/045

FOREIGN PATENT DOCUMENTS

CN           206036701 U      3/2017

* cited by examiner

*Primary Examiner* — Anne M Hines
(74) *Attorney, Agent, or Firm* — Bayramoglu Law Offices LLC

(57) ABSTRACT

A full spectrum LED grow light with a lens structure includes a shell. The shell is connected to an electric wire and configured with a full spectrum LED unit. The full spectrum LED unit includes LED cells and lenses covering the LED cells. Each of the LED cells can emit full spectrum light. The LED cells are fixed on an aluminum substrate which is electrically connected to the electric wire and fixed inside the shell. The lenses are fixed on the surface of the shell and each lens is configured with at least one LED cell. By combining the LED cells with the lenses, where a single LED cell can emit full spectrum light, the penetrability of light is increased. Thus, not only the upper layer of plant can grow well, but also the middle and lower layers of plant covered by the leaves of the upper layer can grow well.

9 Claims, 4 Drawing Sheets

FULL SPECTRUM LED PLANT ILLUMINATION LAMP WITH A LENS STRUCTURE

CROSS REFERENCE TO THE RELATED APPLICATIONS

This application is based upon and claims priority to Chinese Patent Application No. 201810531577.3, filed on May 29, 2018, the entire contents of which are incorporated herein by reference.

TECHNICAL FIELD

The present invention relates to the technical field of plant cultivation, and in particular, to a full spectrum LED plant illumination lamp with a lens structure.

BACKGROUND

Photosynthesis is a biochemical process in which plants, algae, and some bacteria, when exposed to visible light, use photosynthetic pigments to transfer carbon dioxide (or hydrogen sulfide) and water into organic matter and release oxygen (or hydrogen) through light-dependent reactions and light-independent reactions. Plants cannot grow, bloom, and fertilize without photosynthesis, and light is one of the necessary conditions for photosynthesis.

To increase illumination or cultivate plants indoors, people use lamplight to substitute sun light. Sunlight is a full spectrum light, which consists of lights with different wavelengths. Research shows that different plants and plants at different stages of their growth need light of different wavelengths and wavebands. In addition, full spectrum light is more advantageous for the growth of plants.

A full spectrum plant illumination lamp which includes multiple blue lamps, multiple purple lamps, and multiple red lamps is provided by an issued patent No. 201621067027.3 entitled "a full spectrum plant illumination lamp". The blue lamps produce light at wavelengths greater than or equal to 450 nm and less than or equal to 465 nm. The purple lamps produce light at wavelengths greater than or equal to 400 nm and less than or equal to 420 nm. The red lamps produce light at wavelengths greater than or equal to 650 nm and less than or equal to 670 nm. The ratio of the number of the blue lamps to that of the purple lights is 8:2. The multiple red lamps are arranged in at least one track. The plant illumination lamp simulates a full spectrum light with a combination of blue, purple, and red lamps which isn't strictly a real full spectrum light. And the light having poor penetrability causes uneven growth of plants. Namely, the upper layer of plants grows well while the middle and the lower layer covered by the leaves of the upper layer grows in undesirable way, thereby causing bad plant growth and low fruit yield. Therefore, such structure needs to be further improved.

SUMMARY

It's therefore an objective of the present invention to provide a full spectrum plant illumination lamp with a lens structure considering the problems of the prior art stated above, which has simple structure, good penetrability, and helps plants to grow.

To solve the above technical problems, the present invention is implemented by the following technical solutions.

A full spectrum LED plant illumination lamp with a lens structure includes a shell, wherein the shell is connected to an electric wire and is provided with a full spectrum LED unit. The full spectrum LED unit includes LED cells and lenses covering the LED cells, wherein each LED cell can emit full spectrum light. The LED cells are fixed on an aluminum substrate, and the aluminum substrate is electrically connected to an electric wire and fixed inside the shell. The lenses are fixed on the surface of the shell, and each lens is internally configured with at least one LED cell.

The present invention further provides the following optimal technical solutions.

A back of the shell is configured with a radiator.

The shell includes an upper shell body and a lower shell body. The radiator and the upper shell body have an integrated structure.

The radiator consists of vertically configured heat-dissipation plates arranged at intervals.

The lower shell body is embedded with a sealing ring, the sealing ring is configured with convex portions, and the convex portions are concave inward and arranged at intervals.

Each of the lenses is internally configured with one to ten LED cells.

The taper of the top of the lens is from 30° to 90°.

The shell is strip-shaped.

The aluminum substrate is fixed on the inner surface of the lower shell body through screws, and the upper shell body and the lower shell body are fixed together through screws.

End covers are fixed at two ends of the shell body.

The present invention provides a full spectrum LED plant illumination lamp with lens structure which has a simple structure and uses a cellular structure of full spectrum LED units. By combining the LED cells with the lenses, wherein a single LED cell can emit full spectrum light, the penetrability of light is increased. Thus, not only the upper layer of plant grows well, but also the middle and lower layers of plant covered by the leaves of the upper layer grow well too. Therefore, the whole plant can grow well and the natural light can be better simulated to facilitate the growth of plants, thereby greatly improving the production capacity.

DETAILED DESCRIPTION OF THE EMBODIMENTS

The present invention will be described in detail hereinafter with reference to the drawings and embodiments.

Figure 1:
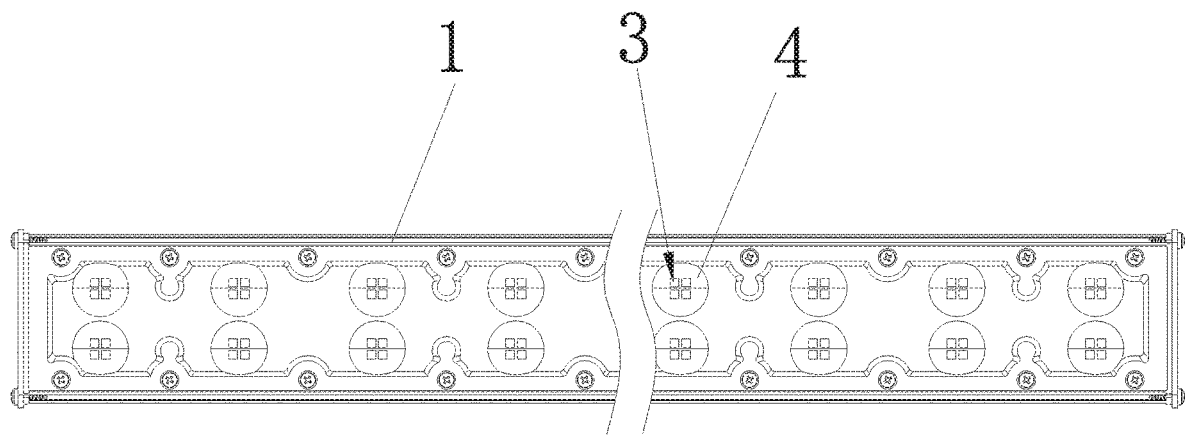
FIG. 1 is a structural diagram of the present invention.
Figure 2:
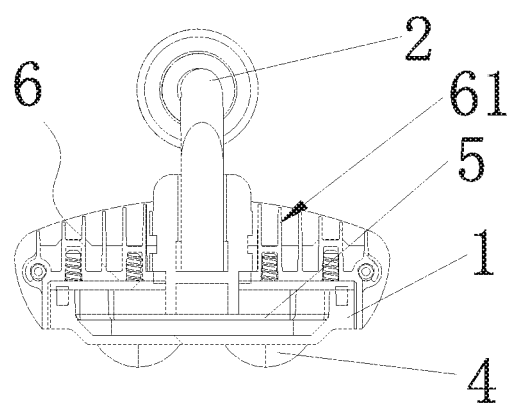
FIG. 2 is a section view of the present invention.
Figure 3:
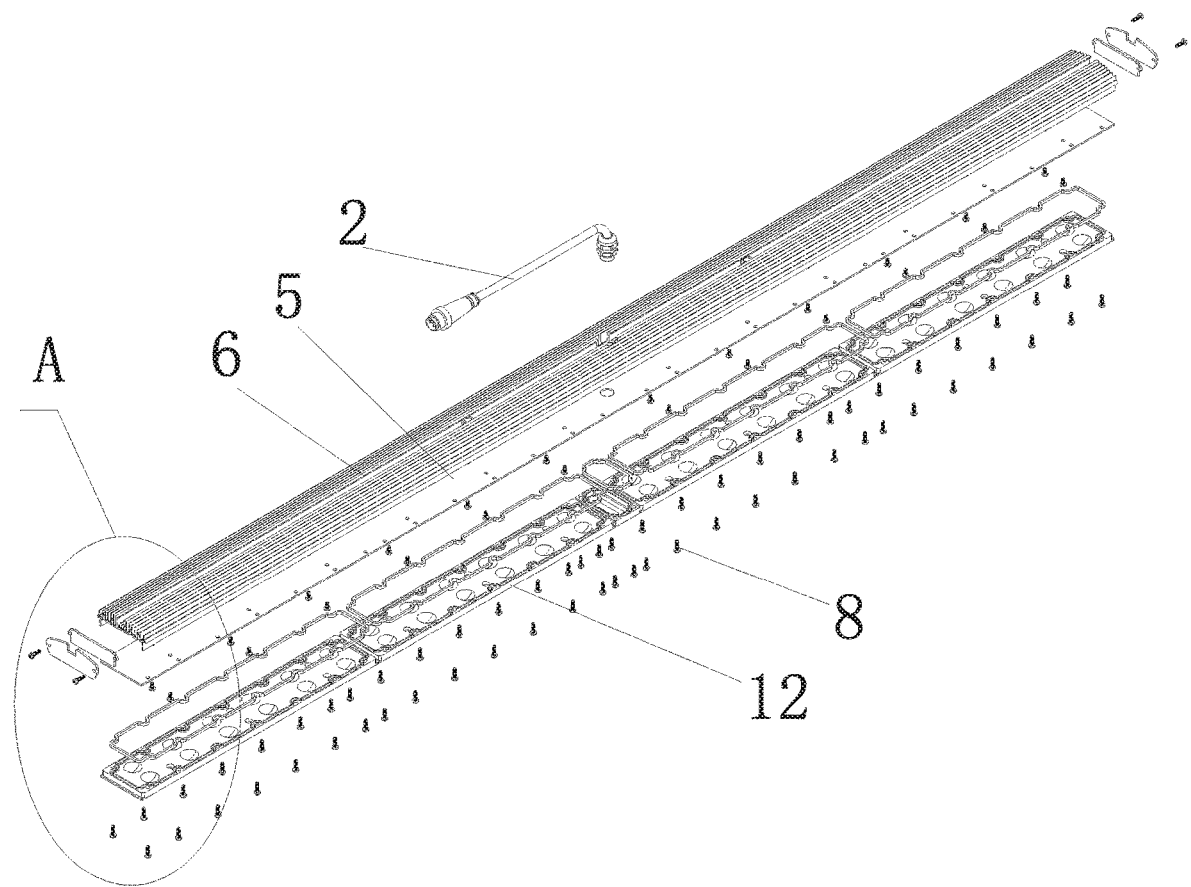
FIG. 3 is an exploded view of the present invention.
Figure 4:
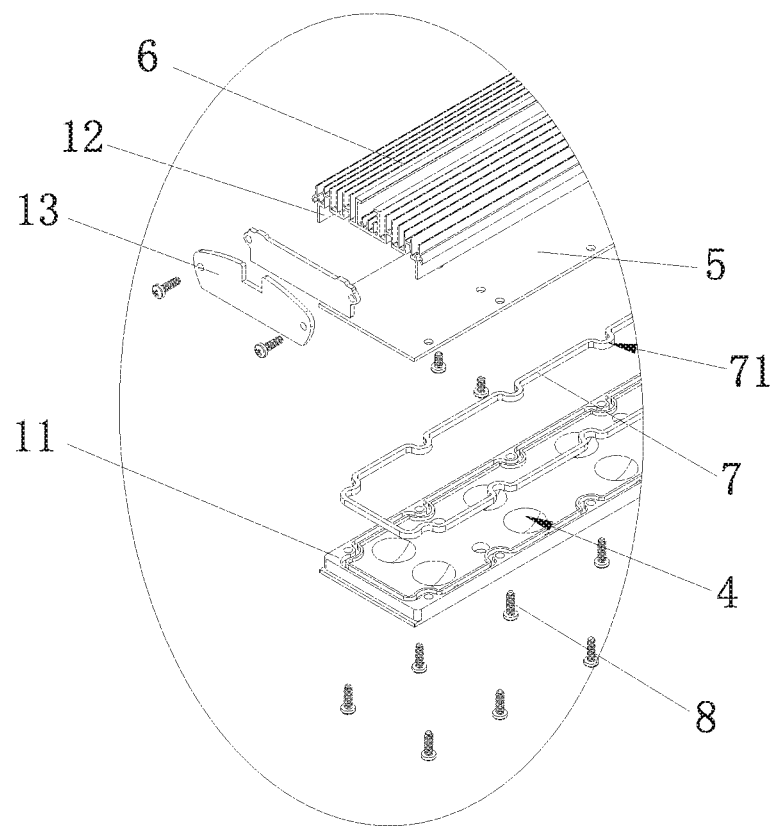
FIG. 4 is an enlarged view of part A in FIG. 3.

FIG. 1 to FIG. 4 show structural diagrams of the present invention.

The reference designators in the drawings are described below: shell 1, upper shell body 11, lower shell body 12, end cover 12, electric wire 2, LED cell 3, lens 4, aluminum substrate 5, radiator 6, heat-dissipation plate 61, sealing ring 7, convex portion 71, screw 8.

FIG. 1-FIG. 4 show a full spectrum LED plant illumination lamp with a lens structure which includes shell 1. Shell 1 is connected to electric wire 2. The full spectrum LED unit is configured on shell 1. The full spectrum LED unit includes LED cells 3 and lenses 4 covering outside LED cells 3. Each LED cell 3 can emit full spectrum light. LED cells 3 are fixed on aluminum substrate 5 which is electrically connected to electric wire 2 and fixed inside shell 1. Lenses 4 are fixed on the surface of shell 1 and each lens 4 is internally configured with at least one LED cell 3.

In one embodiment, the back of shell 1 is configured with radiator 6.

In one embodiment, shell 1 consists of upper shell body 11 and lower shell body 12. Radiator 6 and upper shell body 11 have an integrated structure.

In one embodiment, radiator 6 consists of vertically configured heat-dissipation plates 61 arranged at intervals.

The configuration of radiator 6 can accelerate heat dissipation for the lamp, so as to protect internal components and prolong service life of the apparatus. With the integrated structure of radiator 6 and upper shell body 11, a more compact structure is provided. Radiator 6 consists of vertically configured heat-dissipation plates 61 arranged at intervals, and a concave cavity is formed at the middle. The height of heat-dissipation plates 61 near the concave cavity is higher than that of heat-dissipation plates 61 away from the concave cavity. By doing so, not only the surface area of the dissipation plates in contact with the air is greatly enlarged to speed up the heat transfer, but also the heat dissipation of the apparatus is improved owing to the heat dissipation area of the middle area which is greater than that of the two sides since most of the components of the lamp are concentrated at the middle part.

In one embodiment, lower shell body 12 is embedded with sealing ring 7. Sealing ring 7 is configured with convex portions 71. And convex portions 71 are concave inward and arranged at intervals. Sealing ring 7 is embedded in a sealing ring groove matched with the sealing ring.

The use of sealing ring 7 can improve the sealing between upper shell body 11 and lower shell body 12. Moreover, by configuring convex portions 71 on sealing ring 7 at intervals, the tortuosity of sealing ring 7 can be improved, thus further improving the sealing and preventing external impurities and moisture from entering the lamp and influencing its service life.

Each of the lenses 4 is internally configured with one to ten LED cells 3. Since the cross profile of lens 4 is round, in most cases, LED cells 3 inside lens 4 are arranged with the quantity of $N^2$, such as 1, 4 and 9, which makes LED cells 3 inside lenses 4 form a square so that LED cells 3 can be arranged in a more centralized and even manner. In this embodiment, each lens 4 is internally configured with four LED cells 3.

In one embodiment, the taper of the top of lens 4 is from 30° to 90°.

In one embodiment, shell 1 is strip-shaped.

In one embodiment, aluminum substrate 5 is fixed on the inner surface of lower shell body 12 through screws 8, and upper shell body 11 is fixed with lower shell body 12 through screws 8.

In one embodiment, end covers 13 are fixed at two ends of shell 1.

In the present invention, each LED cell 3 can emit full spectrum light and are used in the grow lamp to ensure that each LED is capable of emitting full spectrum light independently, so that light emitted by LED cells 3 can simulate natural light better. With the cooperation of LED cells 3 and lenses 4, the penetrability and intensity of the full spectrum light produced by the LED can be greatly improved, thereby preventing influences on the lower layer of plants covered by the upper layer of plants. Therefore, the whole plant can get sufficient lighting which guarantees a good growth of the whole plant, greatly increases the fruit yield, and saves resources.

The preferred embodiments of the present invention have been illustrated. Various changes and modifications that may be made by those of ordinary skill in the art should also be considered as falling within the scope of the present invention.

What is claimed is:

1. A full spectrum LED plant illumination lamp with a lens structure, comprising: a shell, wherein the shell is connected to an electric wire and provided with a full spectrum LED unit; the full spectrum LED unit comprises LED cells and lenses covering the LED cells, and each of the LED cells emits full spectrum light; the LED cells are fixed on an aluminum substrate, the aluminum substrate is electrically connected to the electric wire and fixed inside the shell, and the lenses are fixed on a surface of the shell; each of the lenses is internally configured with at least one LED cell; and a back of the shell is provided with a radiator, wherein the radiator comprises vertically configured heat-dissipation plates arranged at intervals and a concave cavity located in a middle of the heat-dissipation plates, wherein a height of the heat-dissipation plates near the concave cavity is taller than the heat-dissipation plates away from the concave cavity.

2. The full spectrum plant illumination lamp with the lens structure according to claim 1, wherein the shell comprises an upper shell body and a lower shell body, and the radiator forms an integrated structure with the upper shell body.

3. The full spectrum LED plant illumination lamp with the lens structure according to claim 2, wherein the lower shell body is embedded with a sealing ring, the sealing ring is configured with convex portions, and the convex portions are concave inward and arranged at intervals.

4. The full spectrum LED plant illumination lamp with the lens structure according to claim 3, wherein each of the lenses is internally configured with one to ten LED cells.

5. The full spectrum LED plant illumination lamp with the lens structure according to claim 4, wherein a taper of the top of the lenses is from 30° to 90°.

6. The full spectrum LED plant illumination lamp with the lens structure according to claim 5, wherein the shell is strip-shaped.

7. The full spectrum LED plant illumination lamp with the lens structure according to claim 6, wherein the aluminum substrate is fixed on an inner surface of the lower shell body through screws, and the upper shell body is fixed with the lower shell body through screws.

8. The full spectrum LED plant illumination lamp with the lens structure according to claim 7, wherein end covers are fixed at two ends of the shell.

9. The full spectrum LED plant illumination lamp with the lens structure according to claim 1, wherein the LED cells form a square.

* * * * *